US009427726B2

(12) United States Patent
Chaikittisilp et al.

(10) Patent No.: US 9,427,726 B2
(45) Date of Patent: Aug. 30, 2016

(54) VAPOR PHASE METHODS OF FORMING SUPPORTED HIGHLY BRANCHED POLYAMINES

(71) Applicant: Georgia Tech Research Corporation, Atlanta, GA (US)

(72) Inventors: Watcharop Chaikittisilp, Atlanta, GA (US); Christopher W. Jones, Mableton, GA (US)

(*) Notice: Subject to any disclaimer, the term of this patent is extended or adjusted under 35 U.S.C. 154(b) by 0 days.

(21) Appl. No.: 14/633,967

(22) Filed: Feb. 27, 2015

(65) Prior Publication Data
US 2015/0165417 A1 Jun. 18, 2015

Related U.S. Application Data

(63) Continuation of application No. 13/650,377, filed on Oct. 12, 2012, now abandoned.

(60) Provisional application No. 61/546,760, filed on Oct. 13, 2011.

(51) Int. Cl.
*B01J 20/30* (2006.01)
*B01J 20/32* (2006.01)
*B01J 20/26* (2006.01)
*B01J 20/28* (2006.01)
*B01J 20/10* (2006.01)

(52) U.S. Cl.
CPC .......... *B01J 20/3278* (2013.01); *B01J 20/103* (2013.01); *B01J 20/262* (2013.01); *B01J 20/28* (2013.01); *B01J 20/28023* (2013.01); *B01J 20/28033* (2013.01); *B01J 20/28042* (2013.01); *B01J 20/3204* (2013.01); *B01J 2220/84* (2013.01); *Y02C 10/08* (2013.01)

(58) Field of Classification Search
CPC ...................................................... B01J 20/30
See application file for complete search history.

(56) References Cited

U.S. PATENT DOCUMENTS

| | | | |
|---|---|---|---|
| 3,466,138 A | 9/1969 | Spiegler et al. |
| 3,491,031 A | 1/1970 | Stoneburner |
| 3,725,387 A | 4/1973 | McClendon et al. |
| 3,865,924 A | 2/1975 | Gidaspow et al. |
| 3,880,981 A | 4/1975 | Garingarao |
| 3,948,627 A | 4/1976 | Schwarz et al. |
| 4,047,894 A | 9/1977 | Kuhl |
| 4,152,217 A | 5/1979 | Eisenberg et al. |
| 4,197,421 A | 4/1980 | Steinberg |
| 4,239,515 A | 12/1980 | Yanagioka et al. |
| 4,243,613 A | 1/1981 | Brockhaus et al. |
| 4,285,918 A | 8/1981 | Gustafson |
| 4,455,153 A | 6/1984 | Jakahi |
| 4,472,178 A | 9/1984 | Kumar et al. |
| 4,497,641 A | 2/1985 | Brown et al. |
| 4,528,248 A | 7/1985 | Galbraith |
| 4,579,723 A | 4/1986 | Weltmer et al. |
| 4,711,645 A | 12/1987 | Kumar |
| 4,762,528 A | 8/1988 | Reichl |
| 4,808,317 A | 2/1989 | Berry et al. |
| 4,810,266 A | 3/1989 | Zinnen et al. |
| 4,822,383 A | 4/1989 | Brose et al. |
| 5,061,455 A | 10/1991 | Brose et al. |
| 5,087,597 A | 2/1992 | Leal et al. |
| 5,364,887 A | 11/1994 | Konig et al. |
| 5,376,614 A | 12/1994 | Birbara et al. |
| 5,424,051 A | 6/1995 | Nagji et al. |
| 5,443,804 A | 8/1995 | Parker et al. |
| 5,492,683 A | 2/1996 | Birbara et al. |
| 5,520,894 A | 5/1996 | Heesink et al. |
| 5,593,475 A | 1/1997 | Minh |
| 5,595,238 A | 1/1997 | Mark et al. |
| 5,635,142 A | 6/1997 | Ichiki et al. |
| 5,642,630 A | 7/1997 | Abdelmalek et al. |
| 5,653,785 A | 8/1997 | Horio et al. |
| 5,871,646 A | 2/1999 | Jones et al. |
| 5,876,488 A | 3/1999 | Birbara et al. |
| 5,879,432 A | 3/1999 | Morlec et al. |
| 5,906,806 A | 5/1999 | Clark |
| 5,928,806 A | 7/1999 | Olah et al. |
| 5,958,353 A | 9/1999 | Eyal |
| 6,004,381 A | 12/1999 | Rohrbach et al. |
| 6,048,509 A | 4/2000 | Kawai et al. |
| 6,090,186 A | 7/2000 | Spencer |
| 6,106,595 A | 8/2000 | Spencer |
| 6,117,404 A | 9/2000 | Mimura et al. |
| 6,174,506 B1 | 1/2001 | Chakravarti et al. |
| 6,350,298 B1 | 2/2002 | Su et al. |
| 6,364,938 B1 | 4/2002 | Birbara et al. |
| 6,387,337 B1 | 5/2002 | Pennline et al. |

(Continued)

FOREIGN PATENT DOCUMENTS

| | | |
|---|---|---|
| CN | 1709553 | 12/2005 |
| DE | 200 01 385 U1 | 9/2000 |

(Continued)

OTHER PUBLICATIONS

Mahapatra, Sibdas Singha, et al., "Hyperbranched Aromatic Polyamines with s-Triazine Rings". Journal of Applied Polymer Science, vol. 106, 95-102 (2007).*
Kubisa, P., et al., "Cationic activated monomer polymerization of heterocyclic monomers". Prog. Polym. Sci. 24 (1999) 1409- 1437.*
Stolaroff, Joshuah et al. "A Pilot-scale prototype contractor for CO2 capture from ambient air; cost and energy requirements." (2006) www.ucalgary.ca/~keith/papers/84.Stolaroff.Air . . . .
English abstract, CN 1 303 910 A (Jul. 18, 2001) as cited in U.S. Pat. No. 7,795,175.
English abstract, JP 2006-021989 A (Jan. 26, 2006) as cited in U.S. Pat. No. 7,795,175.

(Continued)

*Primary Examiner* — Bret Chen
(74) *Attorney, Agent, or Firm* — Paul J. Sutton; Barry G. Magidoff

(57) ABSTRACT

Methods of making supported polyamines, supported polyamines, and the like, are disclosed.

19 Claims, 7 Drawing Sheets

(56) References Cited

U.S. PATENT DOCUMENTS

| | | | |
|---|---|---|---|
| 6,500,236 B2 | 12/2002 | Suzuki et al. |
| 6,540,936 B1 | 4/2003 | Takagi et al. |
| 6,547,854 B1 | 4/2003 | Gray et al. |
| 6,612,485 B2 | 9/2003 | Lackner et al. |
| 6,790,430 B1 | 9/2004 | Lackner et al. |
| 6,797,039 B2 | 9/2004 | Spencer |
| 6,800,331 B2 | 10/2004 | Bilyk et al. |
| 6,873,267 B1 | 3/2005 | Tubel et al. |
| 6,890,497 B2 | 5/2005 | Rau et al. |
| 6,908,497 B1 | 6/2005 | Sirwardane |
| 6,929,680 B2 | 8/2005 | Krushnevych et al. |
| 6,960,242 B2 | 11/2005 | Leitch et al. |
| 7,128,777 B2 | 10/2006 | Spencer |
| 7,132,090 B2 | 11/2006 | Dziedzic et al. |
| 7,141,859 B2 | 11/2006 | DeBoer et al. |
| 7,288,136 B1 | 10/2007 | Gray et al. |
| 7,385,012 B2 | 6/2008 | Chang et al. |
| 7,452,406 B2 | 11/2008 | Little et al. |
| 7,584,171 B2 | 9/2009 | Guan et al. |
| 7,655,069 B2 | 2/2010 | Wright et al. |
| 7,658,994 B2 | 2/2010 | Lakshmi |
| 7,666,250 B1 | 2/2010 | Blencoe et al. |
| 7,699,909 B2 | 4/2010 | Lackner et al. |
| 7,708,806 B2 | 5/2010 | Wright et al. |
| 7,795,175 B2 | 9/2010 | Olah et al. |
| 7,799,310 B2 | 9/2010 | Lackner et al. |
| 7,827,778 B2 | 11/2010 | Finkenrath et al. |
| 7,833,328 B2 | 11/2010 | Lackner et al. |
| 7,909,911 B2 | 3/2011 | Lackner et al. |
| 7,947,239 B2 | 5/2011 | Lackner et al. |
| 7,976,897 B2 | 7/2011 | Bhat et al. |
| 7,988,766 B2 | 8/2011 | White et al. |
| 7,993,432 B2 | 8/2011 | Wright et al. |
| 8,043,594 B2 | 10/2011 | Lackner et al. |
| 8,052,776 B2 | 11/2011 | Jiang |
| 8,083,836 B2 | 12/2011 | Wright et al. |
| 8,088,197 B2 | 1/2012 | Wright et al. |
| 8,118,914 B2 | 2/2012 | Liu et al. |
| 8,123,842 B2 | 2/2012 | Pan et al. |
| 8,133,305 B2 | 3/2012 | Lackner et al. |
| 8,163,066 B2 | 4/2012 | Eisenberger |
| 8,491,705 B2 | 7/2013 | Choi et al. |
| 8,500,855 B2 | 8/2013 | Eisenberger |
| 8,529,664 B2 | 9/2013 | Deckman et al. |
| 8,894,747 B2 | 11/2014 | Eisenberger et al. |
| 2001/0004895 A1 | 6/2001 | Preiss |
| 2001/0047995 A1 | 12/2001 | Pozgainer et al. |
| 2002/0000260 A1 | 1/2002 | Palvoelgyi et al. |
| 2002/0083833 A1 | 7/2002 | Nalette et al. |
| 2002/0187372 A1 | 12/2002 | Hall et al. |
| 2003/0061906 A1 | 4/2003 | Knunz et al. |
| 2003/0075012 A1 | 4/2003 | Knunz et al. |
| 2004/0142888 A1 | 7/2004 | Manne et al. |
| 2004/0213705 A1 | 10/2004 | Blencoe et al. |
| 2004/0229045 A1 | 11/2004 | Hesselmans et al. |
| 2004/0253159 A1 | 12/2004 | Hakka et al. |
| 2005/0027081 A1 | 2/2005 | Okushita et al. |
| 2005/0096438 A1* | 5/2005 | Chang ............... C08F 26/06 525/374 |
| 2005/0142296 A1* | 6/2005 | Lakshmi ......... G01N 33/54353 427/301 |
| 2005/0180910 A1 | 8/2005 | Park et al. |
| 2006/0051274 A1 | 3/2006 | Wright et al. |
| 2006/0084063 A1 | 4/2006 | Costa et al. |
| 2006/0101945 A1 | 5/2006 | Lackner et al. |
| 2006/0105419 A1 | 5/2006 | Blankenberg et al. |
| 2006/0165574 A1 | 7/2006 | Sayari |
| 2006/0168940 A1 | 8/2006 | Offenhuber et al. |
| 2006/0178989 A1 | 8/2006 | Lackner et al. |
| 2006/0186562 A1 | 8/2006 | Wright et al. |
| 2006/0188423 A1 | 8/2006 | Cadours et al. |
| 2006/0289003 A1 | 12/2006 | Lackner et al. |
| 2007/0004023 A1 | 1/2007 | Trachtenberg |
| 2007/0033767 A1 | 2/2007 | Dodson et al. |
| 2007/0065490 A1 | 3/2007 | Schaberg et al. |
| 2007/0068525 A1 | 3/2007 | Offenhuber et al. |
| 2007/0086909 A1 | 4/2007 | Abenthung et al. |
| 2007/0187247 A1 | 8/2007 | Lackner et al. |
| 2007/0209349 A1 | 9/2007 | Ripper et al. |
| 2008/0031801 A1 | 2/2008 | Lackner et al. |
| 2008/0064184 A1 | 3/2008 | Lackner et al. |
| 2008/0087165 A1 | 4/2008 | Wright et al. |
| 2008/0090480 A1 | 4/2008 | Akimoto et al. |
| 2008/0112868 A1 | 5/2008 | Blencoe et al. |
| 2008/0124666 A1 | 5/2008 | Stocker et al. |
| 2008/0138265 A1 | 6/2008 | Lackner et al. |
| 2008/0187755 A1 | 8/2008 | Herfert et al. |
| 2008/0190567 A1 | 8/2008 | Winsness et al. |
| 2008/0199613 A1* | 8/2008 | Bhat ................... C23C 16/4408 427/255.28 |
| 2008/0227169 A1 | 9/2008 | Benson et al. |
| 2008/0250715 A1 | 10/2008 | Cooper et al. |
| 2008/0264029 A1 | 10/2008 | Sepaniak |
| 2008/0289319 A1 | 11/2008 | Eisenberger et al. |
| 2008/0289495 A1 | 11/2008 | Eisenberger et al. |
| 2008/0289499 A1 | 11/2008 | Eisenberger et al. |
| 2008/0289500 A1 | 11/2008 | Eisenberger et al. |
| 2008/0314246 A1 | 12/2008 | Deckman et al. |
| 2009/0101050 A1 | 4/2009 | Lackner et al. |
| 2009/0110907 A1 | 4/2009 | Jiang et al. |
| 2009/0232861 A1 | 9/2009 | Wright et al. |
| 2009/0320368 A1 | 12/2009 | Castaldi et al. |
| 2010/0095842 A1 | 4/2010 | Lackner et al. |
| 2010/0105126 A1 | 4/2010 | Wright et al. |
| 2010/0116137 A1 | 5/2010 | Wright et al. |
| 2010/0202937 A1 | 8/2010 | Lackner et al. |
| 2010/0263534 A1 | 10/2010 | Chuang |
| 2010/0267886 A1* | 10/2010 | Roller ................ C08L 33/04 524/502 |
| 2010/0300289 A1 | 12/2010 | Jiang |
| 2011/0000371 A1 | 1/2011 | Eisenberger et al. |
| 2011/0011945 A1 | 1/2011 | Eisenberger et al. |
| 2011/0027143 A1 | 2/2011 | Wright et al. |
| 2011/0027157 A1 | 2/2011 | Wright et al. |
| 2011/0033357 A1 | 2/2011 | Wright et al. |
| 2011/0033358 A1 | 2/2011 | Wright et al. |
| 2011/0041688 A1 | 2/2011 | Eisenberger |
| 2011/0056382 A1 | 3/2011 | Lackner et al. |
| 2011/0079144 A1 | 4/2011 | Wright et al. |
| 2011/0079146 A1 | 4/2011 | Wright et al. |
| 2011/0079147 A1 | 4/2011 | Wright et al. |
| 2011/0079149 A1 | 4/2011 | Wright et al. |
| 2011/0079150 A1 | 4/2011 | Wright et al. |
| 2011/0081709 A1 | 4/2011 | Wright et al. |
| 2011/0081710 A1 | 4/2011 | Wright et al. |
| 2011/0081712 A1 | 4/2011 | Wright et al. |
| 2011/0083554 A1 | 4/2011 | Wright et al. |
| 2011/0088550 A1 | 4/2011 | Tirio |
| 2011/0108421 A1 | 5/2011 | Lackner et al. |
| 2011/0146281 A1 | 6/2011 | Lackner et al. |
| 2011/0185897 A1 | 8/2011 | Wright et al. |
| 2011/0189075 A1 | 8/2011 | Wright et al. |
| 2011/0203174 A1 | 8/2011 | Lackner |
| 2011/0203311 A1 | 8/2011 | Wright et al. |
| 2011/0206588 A1 | 8/2011 | Lackner |
| 2011/0226006 A1 | 9/2011 | Lackner et al. |
| 2011/0226697 A1 | 9/2011 | McLellan |
| 2011/0268636 A1 | 11/2011 | Lackner et al. |
| 2011/0293503 A1 | 12/2011 | Wright et al. |
| 2011/0296872 A1 | 12/2011 | Eisenberger |
| 2012/0058032 A1 | 3/2012 | Lackner et al. |
| 2012/0076711 A1 | 3/2012 | Gebald et al. |
| 2013/0312606 A1 | 11/2013 | Eisenberger |
| 2013/0336722 A1 | 12/2013 | Wright et al. |
| 2014/0026751 A1 | 1/2014 | Anand et al. |
| 2015/0007725 A1 | 1/2015 | Elliott et al. |

FOREIGN PATENT DOCUMENTS

| EP | 20021180511 A2 | 2/2002 |
|---|---|---|
| EP | 20021234947 A2 | 8/2002 |
| EP | 2 160 234 A1 | 3/2010 |
| FR | 19842543946 A1 | 10/1984 |
| JP | 56-162813 | 12/1981 |

(56) References Cited

FOREIGN PATENT DOCUMENTS

| JP | 58-074471 | 5/1983 |
|----|-----------|--------|
| JP | 58 122022 A | 7/1983 |
| JP | 198459216839 | 12/1984 |
| JP | 03-245811 | 1/1991 |
| JP | 02-209678 | 8/1993 |
| JP | 05-209678 | 8/1993 |
| JP | 06-062677 | 3/1994 |
| JP | 06-346856 | 12/1994 |
| JP | 06-348189 | 12/1994 |
| JP | 07-051537 | 2/1995 |
| JP | 09-104419 | 4/1997 |
| JP | 11-244652 | 9/1999 |
| JP | 2001-068487 | 3/2001 |
| JP | 2001-300250 | 10/2001 |
| JP | 2003-326155 | 11/2003 |
| JP | 2004-282109 | 10/2004 |
| JP | 2006-061758 | 3/2006 |
| JP | 2006-075717 | 3/2006 |
| JP | 2008-122598 | 5/2008 |
| WO | WO9829187 A1 | 7/1998 |
| WO | WO2005026694 A2 | 3/2005 |
| WO | WO2005037746 A1 | 4/2005 |
| WO | WO2005108297 A2 | 11/2005 |
| WO | WO2006009600 A2 | 1/2006 |
| WO | WO2006036396 A2 | 4/2006 |
| WO | WO2006/112977 | 10/2006 |
| WO | WO2008042919 | 4/2008 |
| WO | WO2008063082 A2 | 5/2008 |
| WO | WO2008144708 | 11/2008 |

OTHER PUBLICATIONS

Xu et al., "Preparations and characterization of novel CO2 'molecular basket' absorbents based on polymer-modified mesoporous molecular sieve MCM-41." Microporus and Mesoporous Materials 62: 29-45 (2003) as cited in U.S. Pat. No. 7,795,175.

International Search Report and Written Opinion of the International Search Authority, dated Dec. 18, 2007, from corresponding International application No. PCT/US2007/074615 as cited in U.S. Pat. No. 7,795,175.

Hicks, Jason C. et al.; "Designing Adsorbents for CO2 Capture from Flue GAs—Hyperbranched Aminosilicas Capable of Capturing CO2 Reversibly"; Feb. 2009; J. Amer. Chem. Soc., vol. 130, pp. 2902-2903.

Gold, Blanchard; "Integrated Gasification Combined Cycle IGCC"; www.globalgreenhousewarming.com.

Leal, Orlando; "Reversible adsorption of carbon dioxide on amine surface-bonded silica gel", 1995; Elsevier Science S.A., Inorganic Chimica Act 240, pp. 183-189.

Dubey, "Science for sustainability: From capturing carbon dioxide from air to environmental impact of a hydrogen economy," Apr. 2, 2003, pp. 1 and 2.

Vaartstra, Brian A., et al., "Advances in Precursor Development for CVD of Barium-Containing Materials." Mat. Res. Soc. Symp. Proc. vol. 335, pp. 203-208, 1994 Materials Research Society.

Park, Jung Woo, et al., "Strontium B-diketonate complexes with polyamine donor ligands: the synthesis and structural characterization of [Sr(thd)2(L)]n (n=2; L=diethylenetriamine, n+1; L=triethylenetetramine, tetraethylenepentamine and tris(2-aminoethyl)amine) complex." Polyhedron 19 (2000) 2547-2555.

\* cited by examiner

VAPOR PHASE METHODS OF FORMING SUPPORTED HIGHLY BRANCHED POLYAMINES

CLAIM OF PRIORITY TO RELATED APPLICATION

This application claims priority to U.S. provisional application entitled "Method of making supported polyamines and application thereof in extraction of carbon dioxide from carbon dioxide-containing gaseous streams" having Ser. No. 61/546,760, filed on Oct. 13, 2011, which is entirely incorporated herein by reference.

BACKGROUND

Supported amines are of particular importance because these materials can be applied in a wide variety of potential applications such as base-catalyzed reactions, adsorption of heavy metal ions, immobilization of bio-molecules, and carbon dioxide ($CO_2$) capture. Incorporation of amine moieties into/onto the support frameworks has been achieved mostly via four liquid phase synthetic routes: i) physical impregnation of monomeric or polymeric amines into/onto the porous supports, ii) covalent grafting of amines, most often aminosilanes, onto the support surfaces, iii) direct co-condensation amine-containing molecules and conventional precursors during materials syntheses, and iv) in situ polymerization of amine-containing monomers in the pores of supports, with the latter three methods resulting in amines or aminopolymers covalently bound to supports. Specifically, attaching amines via processes that require liquid reagents or solvents can be limiting in some cases. Thus, these approaches are not appropriate or do not provide satisfactory results in all situations and circumstances and there is a need to provide alternative processes in an attempt to overcome the aforementioned inadequacies and deficiencies.

SUMMARY

Briefly described, embodiments of this disclosure, among others, include methods of making a structure including polyamines, structure including polyamines, and the like.

In an embodiment, a method of making a structure including polyamines, among others, includes contacting a monomer having a nitrogen-containing heterocycle with a material, wherein the monomer is in the vapor phase; and forming a hyperbranched polymer on a surface of the material.

Other structures, methods, structures, features, and advantages will be, or become, apparent to one with skill in the art upon examination of the following drawings and detailed description. It is intended that all such additional structures, systems, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of this disclosure. Moreover, in the drawings, like reference numerals designate corresponding parts throughout the several views.

DETAILED DESCRIPTION

Figure 1:
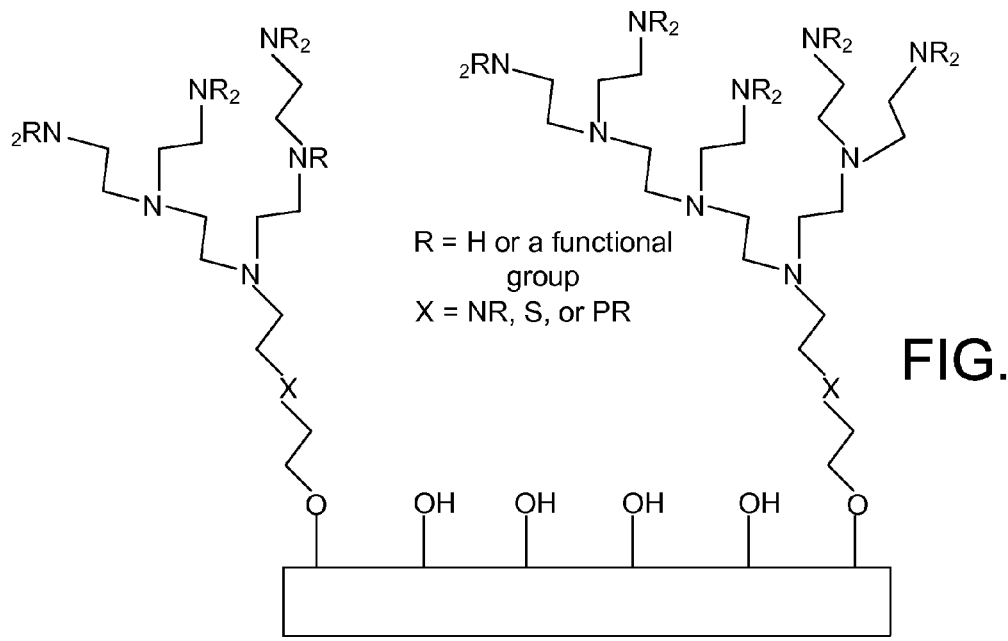
FIGS. 1 and 2 are schematics of illustrative embodiments of the present disclosure.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, inorganic chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

DEFINITIONS

The term "alkyl" refers to straight or branched chain hydrocarbon groups having 1 to 20 carbon atoms such as methyl, ethyl, n-propyl, i-propyl, n-butyl, i-butyl, t-butyl, pentyl, hexyl, heptyl, octyl, and the like. The alkyl group can be substituted (e.g., a halogen).

The term "alkenyl" refers to straight or branched chain hydrocarbon groups having 2 to 20 carbon atoms and at least one double carbon to carbon bond (either cis or trans), such as ethenyl. The alkenyl group can be substituted (e.g., a halogen).

The term "alkynyl" refers to straight or branched chain hydrocarbon groups having 2 to 20 carbon atoms and at least one triple carbon to carbon bond, such as ethynyl. The alkynyl group can be substituted (e.g., a halogen).

The term "aryl" refers to aromatic homocyclic (i.e., hydrocarbon) mono-, bi- or tricyclic ring-containing groups preferably having 6 to 12 members, such as phenyl, naphthyl and biphenyl. The aryl group can be substituted (e.g., a halogen).

A "hyperbranched polymer" may be defined as a polymer in which the structural repeating unit can have a connectivity of more than two and that can include either a single or double branching at each N atom except for the termination of the chain. Hyperbranched polymers are polydisperse.

Discussion

Methods of making supported polyamines, supported polyamines, and the like, are disclosed. In general, the supported polyamine can be a material that includes hyperbranched polymers (e.g., an ethylene-amine hyperbranched polymer, propylene-amine hyperbranched polymer, and the like). An embodiment of the method of forming the hyperbranched polymers on a surface of a material includes forming the hyperbranched polymers from a monomer having a nitrogen-containing heterocycle, where the monomers are in the vapor-phase. In short, monomers in the vapor-phase are contacted with a surface of a material and hyperbranched polymers are formed. In an embodiment, the hyperbranched polymers can be covalently bonded (e.g., directly to the surface or via a linker group, See Figures) to the surface of the material, which may include the surface of pores for a porous material, although the hyperbranched polymers can be otherwise bonded or attached to the surface (e.g., Van der Waals, ionic bonds or hydrogen bonds).

Embodiments of the method can be advantageous in forming or reconstituting materials with hyperbranched polymers without the expense, complexity, and equipment needed when using a liquid-phase approach. In particular, embodiments of the method can be advantageous when the devices or equipment using the materials are disposed in the field where forming and/or reconstituting the hyperbranched polymers using a liquid-phase approach is not practical or in some instances impossible.

In particular, functionalization to solid supports with amines via gas phase or vapor phase processes may provide processing advantages. For example, after use of supported amines in applications such as those described herein, the amine may become deactivated. To allow for reuse of the solid supports, it is sometimes desired to regenerate the desired behavior of the amines or remove the amines from the support, to facilitate attachment of fresh amines. This can be done in many ways, for example when the support is composed of an inorganic oxide, the organic amines can be removed via heat treatment (combustion), allowing for later re-addition of fresh amines. Addition of amines to the support via liquid phase processes can be slow and cumbersome, and use of approaches or processes to attach amines via vapor phase processes would provide advantages.

In an embodiment, the material can be used to adsorb $CO_2$. In this regard, embodiments of the present disclosure can be used to remove $CO_2$ from a gas produced by the use (e.g., burning) of fossil fuels or from $CO_2$ in the ambient air. In general, the material includes one or more of the following: (i) a high loading of amines to facilitate a large $CO_2$ capacity, (ii) adsorption sites (e.g., alkylamine groups) that are covalently linked to the material such as a high surface area solid support to provide stability, (iii) the ability to adsorb and desorb $CO_2$ repeatedly by a temperature swing or other dynamic process, and (iv) a low synthesis and reconstitution cost that can be conducted in the field using the vapor-phase method described herein.

In particular, high surface area materials (e.g., silica structures or particles, or other porous materials) and the hyperbranching of the polymer enable the material to have a high $CO_2$ sorption capacity. In addition, since the hyperbranched polymers are often covalently bonded to the material, the material is stable in uses having temperature swings. In an embodiment, the formation of the hyperbranched polymers can be controlled by the nature of the support, the concentration of the monomers in the vapor phase, the temperature, and the time of exposure. It should be noted that the pores are not overfilled by the hyperbranched polymers, and there exists suitable space for the transport of gases through the pores via diffusion, although other gas transport processes can occur (e.g., advection, convection, and the like). It is also contemplated that a system can be used where the transport of gases is through a pressure drop through the pores. In other embodiments where the pore size is sufficiently large and/or the material is a monolith, the gas can contact the hyperbranched polymers by controlling the flow of the gas relative to the orientation of the material to enhance the performance of the material.

In an embodiment, the hyperbranched polymer is synthesized on the surface of the material (e.g., directly with the metal, directly via the hydroxy group and/or carboxyl group, or indirectly via the linker) from monomers in the vapor phase. In an embodiment, the hyperbranched polymer can be covalently bonded to the support via one or more of the oxygen atoms (e.g., part of the material or a layer added to the material) on the surface of the material.

In general, the material having the hyperbranched polymer bonded or attached (e.g., covalently bonded) thereto can be formed by exposing (e.g., so as to contact the surface of) a material to a monomer having a nitrogen-containing heterocycle, where the monomer is in the vapor-phase in contrast to processes where the monomer is in the liquid-phase. In an embodiment, the size (e.g., length, molecular weight), amount (e.g., number of distinct hyperbranched polymers bonded to the surface), and/or type of hyperbranched polymer, can be controlled by the concentration of the monomer, temperature, and/or length of time of the exposure. In an embodiment, the temperature may be controlled by heating the monomer vapor phase and/or the material. In an embodiment, the material may be in a pressurized system or the monomer vapor-phase may be flowed across the material in a system near ambient pressure. In an embodiment, the concentration of the monomer can be controlled by flow meters and the like as well as mixing with appropriate flow gases (e.g., an inert gas such as Ar, He, $N_2$ and the like). In an embodiment when the concentration is constant, the higher the temperature the shorter the time-frame to form the desired hyperbranched polymer. In an embodiment, the time-frame can be about 0.1 h to 200 h, about 24 to 168 h, about 2 to 24 h, or about 2 to 12 h. In an embodiment, the temperature is at a level so that the monomer is in the vapor-phase under conditions (e.g., pressure, flow of gas, and the like) present around the material. In an embodiment, the temperature can be about 0° to 200° C., about 20° to 120° C., or about 24° to 80° C. Once the material is formed having the hyperbranched polymer, the surface of the material can be rinsed with a solvent (e.g., toluene) and/or a gas (e.g., an inert gas) to remove unreacted monomer. Additional details regarding preparation of the material are described herein.

It should be noted that a linking group can be reacted with the surface of the material (e.g., hydroxyl groups) prior to introduction of the monomer. Typical linking groups will be organosilanes with a reactive atom on a carbon chain such as, but not limited to, N, S, P, or O. The linking group can be added using vapor-phase chemistry and/or liquid-phase chemistry. The linking group can be subsequently reacted with the monomer to form the hyperbranched polymer.

In an embodiment, the material can include particles, powders, porous films, or porous or non-porous macroscopic objects, such as monoliths. In an embodiment, the material can include, but is not limited to, silica, alumina, aluminosilicates, zirconia, germania, magnesia, titania, hafnia, iron oxide, and mixed oxides composed of those elements. In cases where the oxide contains a formal charge, the charge can be balanced by appropriate counter-ions, such as cations of $NR_4$, Na, K, Ca, Mg, Li, H, Rb, Sr, Ba, Cs or anions including phosphate, phosphite, sulfate, sulfate, nitrate, nitrite, chloride, bromide and the like, In an embodiment, the material can include porous structures (e.g., macroporous, mesoporous, microporous, nanoporous, or mixtures thereof). In an embodiment, the material can include organically modified moieties (e.g., hydroxyl groups, carboxylate groups, amines, phosphoric acid, sulfonic acid, thiols, phosphines, and the like) on the surface (e.g., outside and/or inside surfaces of pores) of the material. In an embodiment, the material can include surface hydroxyl groups, carboxylate groups, amines, phosphoric acid groups, sulfonic acid groups, thiols, phosphines, and the like, that the monomers can directly covalently bond and/or indirectly covalently bond (e.g., covalently bond to a linker covalently bonded to the material). In an embodiment, the material can include an organic polymer having one or more of the following groups: hydroxyl groups, carboxylate groups, amines, phosphoric acid groups, sulfonic acid groups, thiols, phosphines, and the like. In another embodiment, the material can be a carbon support, where the carbon support can include one or more of the following groups: hydroxyl groups, carboxylate groups, amines, phosphoric acid groups, sulfonic acid groups, thiols, phosphines, and the like.

In an embodiment, the material can have the form or a shape such as, but not limited to, a particle, a sphere, a polygon, a tube, a rod, a plate, an amorphous shape, a sheet, a monolith, a fiber, and a combination thereof. In an embodiment, the material is porous, in particular, the material is a porous particle (e.g., porous silica particles). In an embodiment, the material can be relatively small and can have a first dimension (that is the largest dimension, e.g., diameter (e.g., particles)), where the first dimension is about 500 nm to 500 µm, about 500 nm to 5 µm, and about 1 µm to 5 µm. In an embodiment, the pore diameter can be about 1 nm to 50 nm, about 1 nm to 20 nm, about 1 to 10 nm, about 1 nm to 8 nm, or about 4 nm to 8 nm.

In some embodiments, the material is a composite of a plurality of smaller materials, so that the dimensions can be larger and include a wide range of pore sizes that can encompass those described for smaller and larger materials. For example, if a bed or film of particles is employed, the bed or film can be composed of primary particles of the size described above, that bond together to form larger particles in the size range of 1 µm to 1 cm, about 10 µm to 1 mm, or about 50 µm to 500 µm.

In an embodiment, the material (e.g., monolith) can have one or more dimensions on the scale of millimeters to centimeters to meters. The dimensions can be selected based on the use of the material and the flow of the gas.

In other embodiments, the material can have a dimension (perpendicular to the gas flow), where the dimension is on the scale of millimeters (e.g., about 2 mm) to centimeters (e.g., about 100 to 500 cm), where the pore size can be hundreds of microns to centimeters. In an embodiment, the dimensions of the material can be about fives to ten times or more than that of the dimension perpendicular to the gas flow.

In an embodiment, the materials can be used in fixed bed and/or fluidized bed processes. For example, the materials can be used in a fixed bed and/or fluidized bed adsorption system and process to remove $CO_2$ from a gas stream.

As mentioned above the monomer includes a nitrogen-containing heterocycle, where the monomer can be an aziridine monomer, an azetidine monomer, a pyrrolidine monomer, or a diazetidine, monomer. In an embodiment, the monomer can be substituted (e.g., halogens, alkyl groups, etc.). In an embodiment, one or more types of monomers can be contacted with the surface of the material to produce one or multiple types of hyperbranched polymers.

In an embodiment, the monomer used to form the hyperbranched polymer can be an aziridine monomer (e.g., cyclo-$(CH_2)_2$—N(H or R3)) and/or a substituted aziridine monomer (e.g., cyclo-$(CR1R2)_2$-N(H or R3)), where each of R1, R2, and R3 can be independently selected from: H, an alkyl, a substituted alkyl, an aryl, a substituted aryl, an alkenyl, a substituted alkenyl, an alkynyl, a substituted alkynyl, where the substitution can be from groups or moieties including: F, Cl, Br, I, N, P, S, O, and the like, and combinations thereof. The monomer can form highly branched polymer chains by either a single or double branching at each N atom, and in some instances no branching. The monomer can react directly with the hydroxyl groups and/or carboxyl groups on the surface of the high surface area structure, creating a covalent bond (via oxygen) with the polymer chain and/or can be indirectly bonded to the hydroxyl groups and/or carboxyl groups via a linker (and in some cases a carboxyl group can be a linker), as described in more detail herein.

In an embodiment, the monomer used to form the hyperbranched polymer can be an azetidine monomer (e.g., cyclo-$(CH_2)_3$—N(H or R3)) and/or a substituted azetidine monomer (e.g., cyclo-$(CR1R2)_3$-N(H or R3)), where each of R1, R2, and R3 can be independently selected from: H, an alkyl, a substituted alkyl, an aryl, a substituted aryl, an alkenyl, a substituted alkenyl, an alkynyl, a substituted alkynyl, where the substitution can be from groups or moieties including: F, Cl, Br, I, N, P, S, O, and the like, and combinations thereof. The monomer can form highly branched polymer chains by either a single or double branching at each N atom, and in some instances no branching. The monomer can react directly with the hydroxyl groups and/or carboxyl groups on the surface of the high surface area structure, creating a covalent bond (via oxygen) with the polymer chain and/or can be indirectly bonded to the hydroxyl groups and/or carboxyl groups via a linker, as described in more detail herein. For monomers having more carbons, the subscript 3 in either cyclo-$(CH_2)_3$—N(H or R3) or cyclo-$(CR1R2)_3$-N(H or R3) can be increased accordingly.

Figure 2:
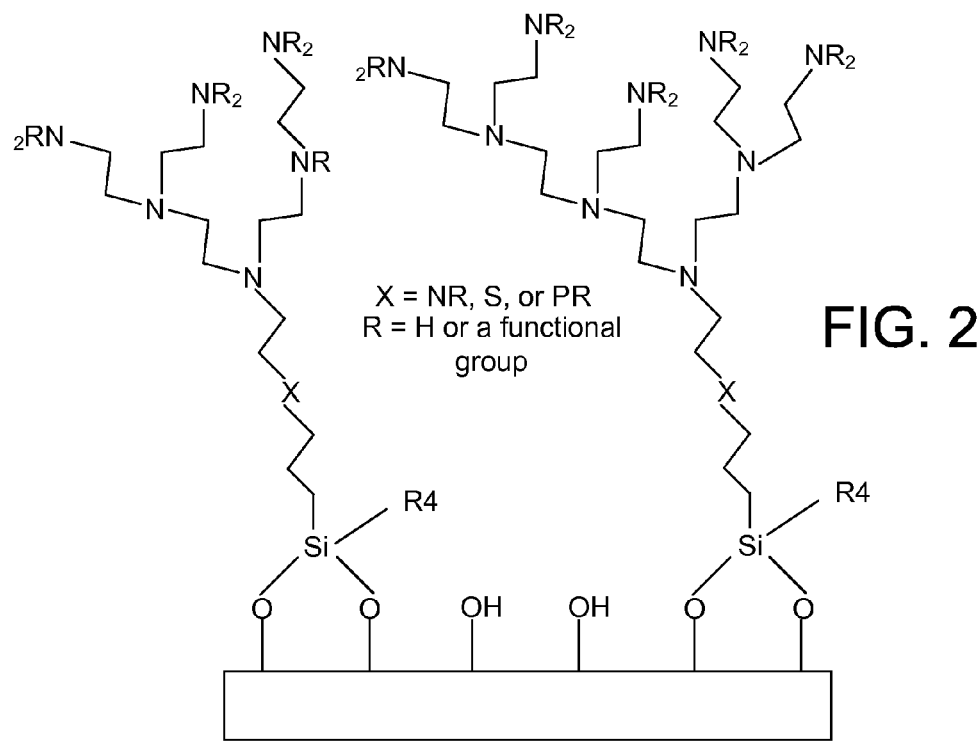

FIGS. 1 and 2 are schematics of illustrative embodiments of the present disclosure. FIG. 1 is a schematic that illustrates the hyperbranched polymer formed of aziridine monomers and/or substituted aziridine monomers (note, the carbon atoms of the monomers could include R rather than hydrogen as implicitly depicted). It should also be noted that R can be a functional group such as, but not limited to, H, an alkyl, a substituted alkyl, an aryl, a substituted aryl, an alkenyl, a substituted alkenyl, an alkynyl, a substituted alkynyl, and combinations thereof, where the substitution can be from groups or moieties including: F, Cl, Br, I, N, P, S, O, and the like. The degree of branching of the hyperbranched polymer shown in FIG. 1 is not limiting, and more or less degrees of branching and/or larger or smaller polymers (molecular weight) can be formed. In an embodiment, each N can have 0, 1, or 2 branches, and the degree of branching depends in part upon the number of branches for each N. It should be noted that a number of branching of N can be 1 or 2 due to the hyperbranching of the polymer and/or the synthesis employed. The hyperbranched polymer is covalently bonded to the high surface area structure via X—$(CR1R2)_2$ (R1 and R2 are not depicted in FIG. 1), where a carbon is bonded to the oxygen atom and X is bonded to the hyperbranched polymer. It should be noted that each of R1 and R2 can be H, an alkyl, a substituted alkyl, an aryl, a substituted aryl, an alkenyl, a substituted alkenyl, an alkynyl, a substituted alkynyl, and combinations thereof, where the substitution can be from groups or moieties including: F, Cl, Br, I, N, P, S, O, and the like, and where X is N—R, S, or P—R. It should be noted that for X—$(CR1R2)_q$, q is from 1 to 20. In an embodiment, X is NH. It should also be noted that if the aziridine monomer is replaced with an azetidine monomer, the $(CR1R2)_2$ chain (not the linker) between N atoms would be changed to $(CR1R2)_3$. Similar changes are envisioned for monomers including different numbers of carbons (e.g., from 2 to 10 carbons). It should also be noted that the carbon chain of the linker can be a shorter or longer (e.g., 4 to 10) carbon chain.

FIG. 2 is a schematic that illustrates the hyperbranched polymer formed of aziridine monomers and/or substituted aziridine monomers (note, the carbon atoms of the monomers could include R rather than hydrogen as implicitly depicted). It should also be noted that R is a functional group such as, but not limited to, H, an alkyl, a substituted alkyl, an aryl, a substituted aryl, an alkenyl, a substituted alkenyl, an alkynyl, a substituted alkynyl, and combinations thereof, where the substitution can be from groups or moieties including: F, Cl, Br, I, N, P, S, O, and the like. The degree of branching of the hyperbranched polymer shown in FIG. 2 is not limiting, and more or less degrees of branching and/or larger or smaller polymers (molecular weight) can be formed. The hyperbranched polymer is covalently bonded to the high surface area structure via X—$(CR1R2)_z$SiR4 (R1 and R2 are not depicted in FIG. 2), where Si is bonded to two oxygen atoms (as depicted), where z can be from 1 to 20, and where X is bonded to the hyperbranched polymer. R4 can be selected from, but is not limited to, an alkyl, a substituted alkyl, an alkenyl, a substituted alkenyl, a methyl, a substituted methyl, an alkoxyl, a substituted alkoxyl, a methoxy, an ethoxy, a n-propoxy, an iso-propoxy, a halogen (e.g., chorine, bromine, iodine, and fluorine), $N(R)_2$, and the like. It should also be noted that if the aziridine monomer is replaced with an azetidine monomer, the $(CR1R2)_2$ chain (not the linker) between N atoms would be changed to $(CR1R2)_3$. Similar changes are envisioned for monomers including different numbers of carbons (e.g., from 2 to 10 carbons). It should also be noted that the carbon chain of the linker can be a shorter or longer (e.g., 4 to 10) carbon chain.

It should be noted that Si can be bonded to 1, 2, or 3 surface oxygen atoms, and although FIG. 2 depicts Si bonded to 2 oxygen atoms, each Si can be bonded to 1, 2, or 3 surface oxygen atoms. If Si is bonded to only one oxygen, then Si can be bonded to groups such as, but not limited to, an alkyl, a substituted alkyl, an aryl, a substituted aryl, an alkenyl, a substituted alkenyl, a methyl, a substituted methyl, an alkoxyl, a substituted alkoxyl, a methoxy, an ethoxy, a n-propoxy, an isopropoxy, a halogen (e.g., chorine, bromine, iodine, and fluorine), $N(R)_2$, and the like.

In general, the silicon compound used to form X—$(CR1R2)_z$SiR4 should have at least one group that will bond to the surface (e.g., halides, an amine (silazanes), an alkoxyl, a substituted alkoxyl, a methoxy, an ethoxy, a n-propoxy, and an isopropoxy) and one chain $(CR1R2)_z$, but the other two groups on the silicon can be groups such as, but not limited to, surface reactive groups, additional $(CR1R2)_z$ groups, and/or inert groups (e.g., an alkyl, an alkenyl, an aryl, and the like). Once the silicon compound bonds to the surface, it has at least one bond to an oxygen on the surface of the structure and at least one bond to a carbon chain $(CR1R2)_z$, while the other bonds, if any, are to one or more groups described above. In an embodiment, z can be 2 to 10.

It should be noted that each of R1 and R2 can independently be H, an alkyl, a substituted alkyl, an aryl, a substituted aryl, an alkenyl, a substituted alkenyl, an alkynyl, a substituted alkynyl, and combinations thereof, where the substitution can be from groups such as but not limited to, F, Cl, Br, I, N, P, S, O, and the like, and where X is N—R, S, or P—R. It should be noted that if X is N—R or P—R, that R could be a branch of the hyperbranched polymer. In an embodiment, z is equal to 3. In an embodiment, R4 is —OMe.

Figure 3:
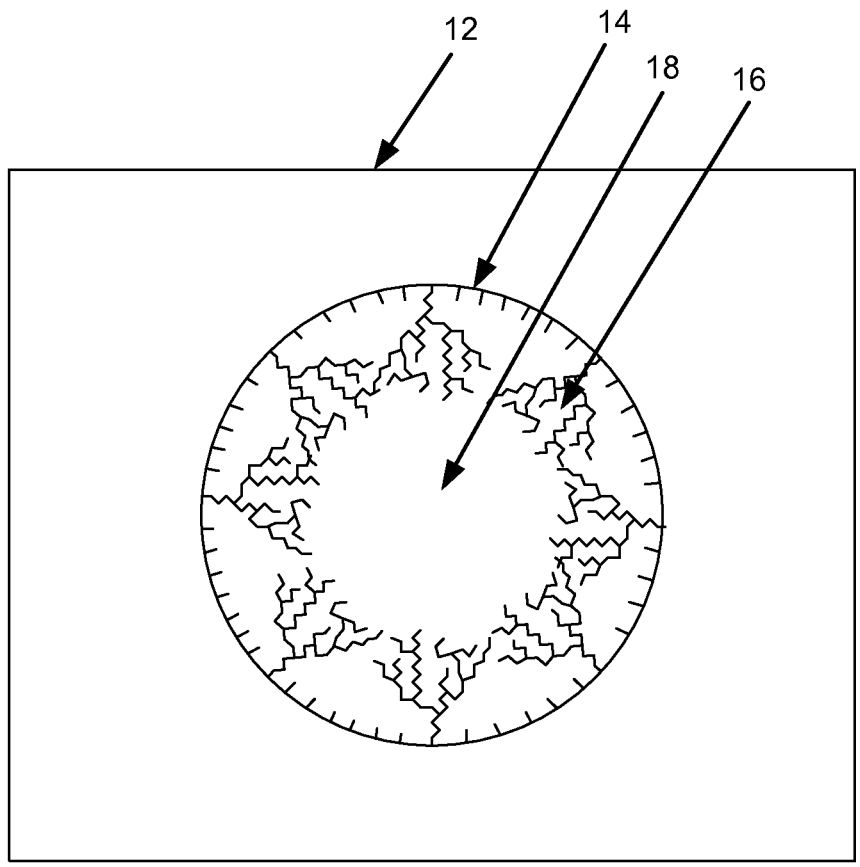
FIG. 3 is a schematic diagram depicting a cross-section of a high surface area structure having a pore that has hyperbranched polymer fabricated therein.

FIG. 3 is a schematic diagram depicting a cross-section of a material 12 that includes a pore 14 that has hyperbranched polymers fabricated therein. As mentioned above, the monomers in the vapor-phase are contacted with the surface of the material and form the hyperbranched polymers. The material 12 includes a pore 14 having hyperbranched polymers 16 disposed on the inside surface of the pore 14 and an open region 18. In addition, FIG. 3 shows that many branches of the hyperbranched polymer 16 that can function as interaction sites for targets such as $CO_2$.

Figure 4:
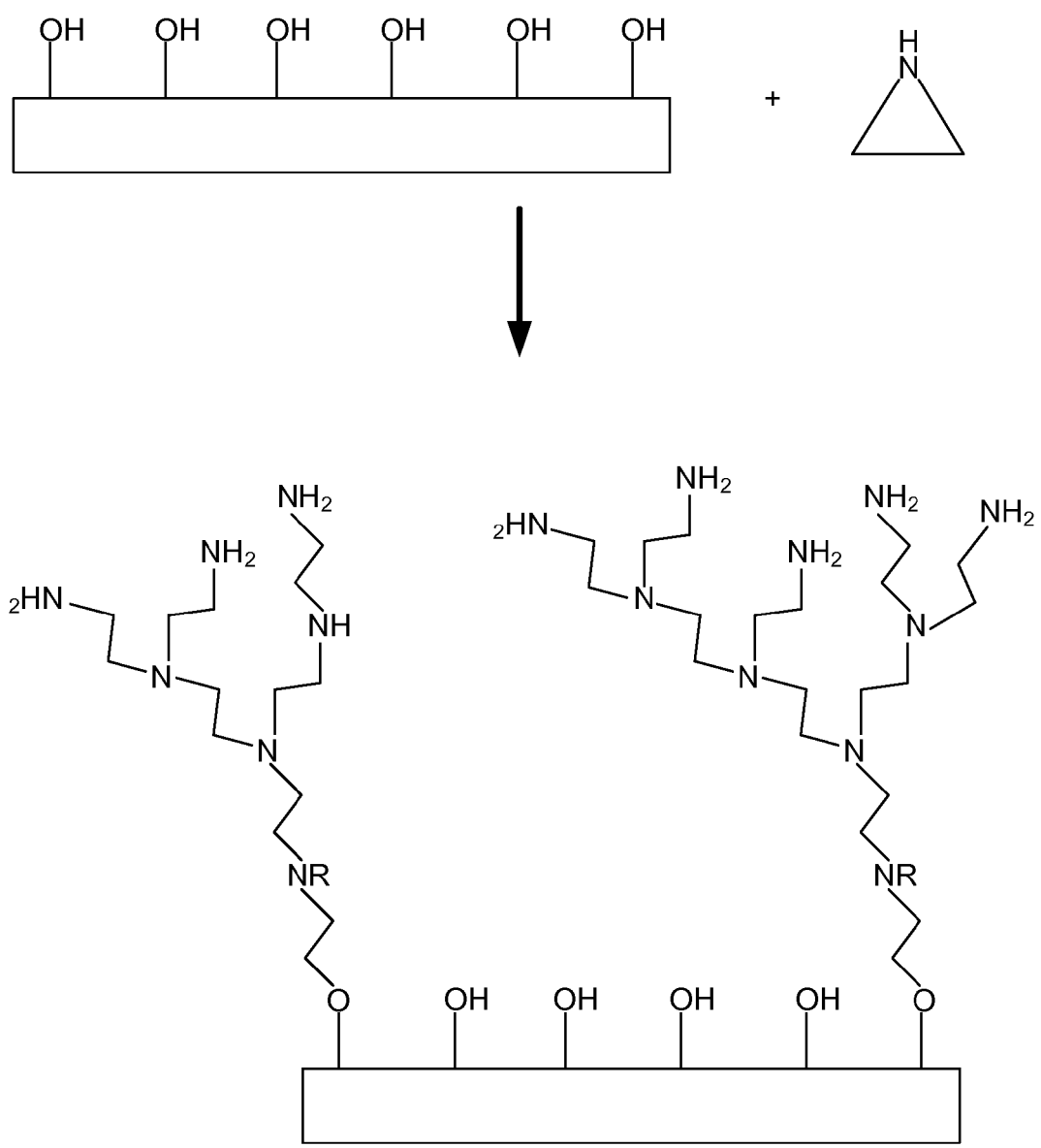
FIG. 4 illustrates a simplified reaction scheme for forming an embodiment of the material, wherein the monomer is in the vapor phase.

FIG. 4 illustrates a simplified reaction scheme for forming an embodiment of the material including the hyperbranched polymers. In this embodiment the material includes hydroxyl groups on the surface that are exposed to aziridine (e.g., other monomers can be used with aziridine or replace aziridine) under appropriate conditions, as described in more detail herein. The aziridine reacts with some of the surface hydroxyl groups to ultimately from the hyperbranched polymer. The degree of branching and the size (molecular weight) of the hyperbranched polymer can be controlled by parameters such as, but not limited to, monomer loading, reaction time, temperature, and the like. It should be noted that R can be H or a branch of the hyperbranched polymer. In an embodiment, each N can have 0, 1, or 2 branches, and the degree of branching depends in part upon the number of branches for each N. It should be noted that a number of branching of N can be 1 or 2 due to the hyperbranching of the polymer and/or the vapor phase synthesis employed.

Figure 5:
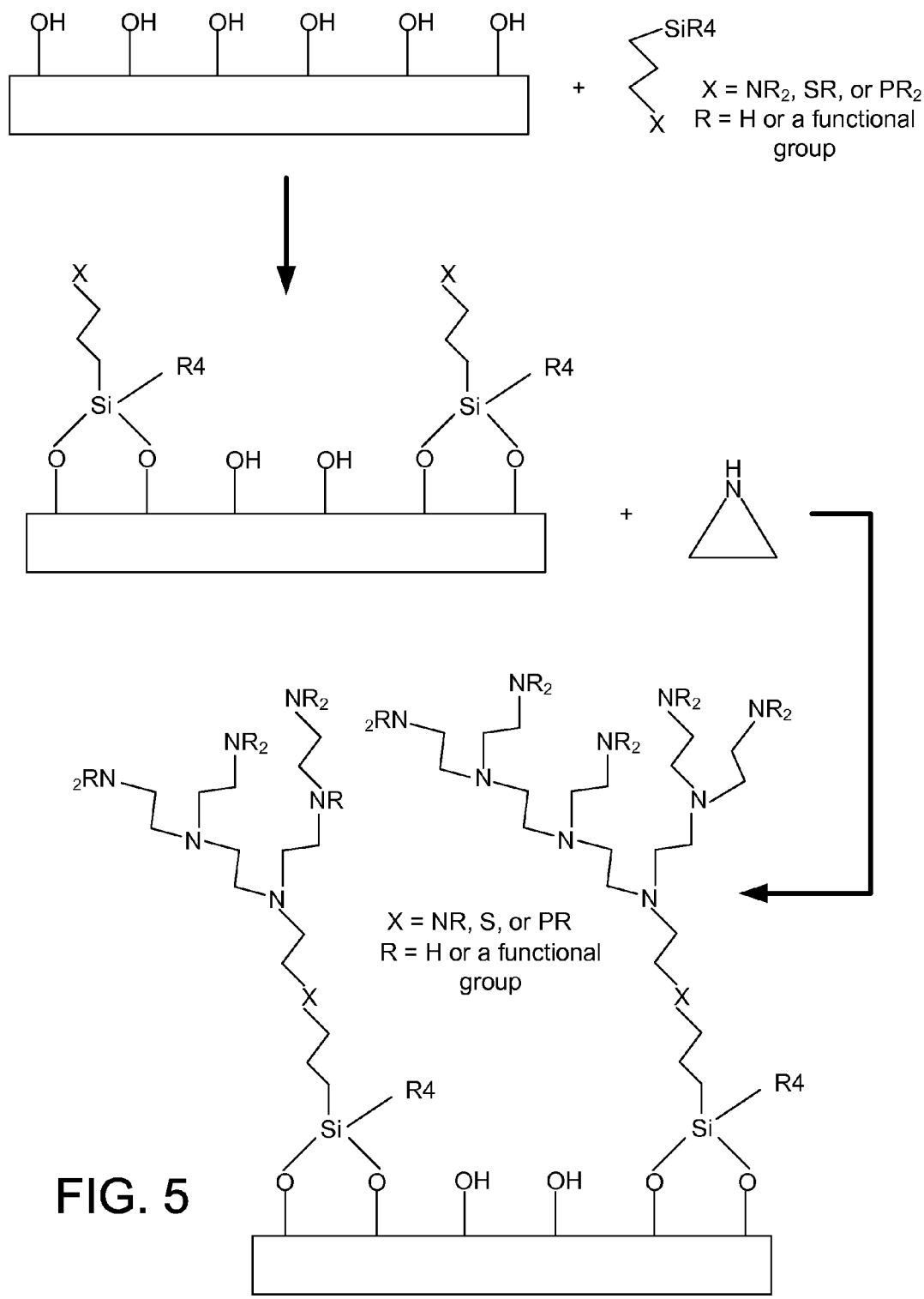
FIG. 5 illustrates a simplified reaction scheme for forming another embodiment of the material, wherein the monomer is in the vapor phase.

FIG. 5 illustrates a simplified reaction scheme for forming an embodiment of the material including the hyperbranched polymer. In this embodiment the material includes hydroxyl groups on the surface that are exposed to a silicon compound having the formula $Si(OMe)_3(CR_2)_2(CH_2X)$, where X is $NR_2$, S—R, or P—$R_2$, and where R is a functional group such as, but not limited to, H, an alkyl, a substituted alkyl, an aryl, a substituted aryl, an alkenyl, a substituted alkenyl, an alkynyl, a substituted alkynyl, and combinations thereof, where the substitution can be from groups or moieties including: F, Cl, Br, I, N, P, S, O, and the like. A modified material is formed when the silicon compound reacts with the hydroxyl groups to form a bond from Si to 1, 2, or 3 oxygen groups. It should be noted that X is N—R, S, or P—R. It should also be noted that the linkers can bond to each other, through Si—O—Si bonds. Next, the modified material is exposed to aziridine (e.g., other monomers can be used with aziridine or replace aziridine) under appropriate conditions, as described in more detail herein. The aziridine reacts with the X group to from the hyperbranched polymer. It should be noted that R can be H or a branch of the hyperbranched polymer. In an embodiment, each N can have 0, 1, or 2 branches, and the degree of branching depends in part upon the number of branches for each N.

EXAMPLE

Now having described the embodiments of the sorbents in general, Example A describes some embodiments of the sorbents and uses thereof. The following is a non-limiting illustrative example of an embodiment of the present disclosure that is not intended to limit the scope of any embodiment of the present disclosure, but rather is intended to provide some experimental conditions and results. Therefore, one skilled in the art would understand that many experimental conditions can be modified, but it is intended that these modifications be within the scope of the embodiments of the present disclosure.

Example A

A novel synthetic route to prepare supported polyamine materials through vapor-phase transport is developed. In this method, the small nitrogen-containing heterocyclic monomers are transported into and onto solid supports in the vapor phase and subsequently polymerization is initiated at the support surface. The obtained supported polyamine materials can contain organic contents comparable to materials prepared via the conventional liquid-phase reactions. The amount of polyamines formed on the supports can be affected by several synthesis parameters including temperature and reaction time. This novel method can applied for efficient introduction of polyamines into other structural forms of supports including fibers, capillary tubes, disk and tubular membranes, and a monolith structure.

Examples

Materials Characterization

Powder X-ray diffraction (XRD) patterns were collected on a Philips X'pert diffractometer using Cu Kα radiation. Nitrogen adsorption-desorption was performed on a Micromeritics TriStar II 3020 at 77 K. Before the measurement, the samples were degassed at 110° C. under vacuum for at least 8 h. Organic loadings were determined by thermogravimetric analysis (TGA) using a Netzsch STA409 instrument. Samples were heated under a mixed gas stream of air (90 mL/min) and nitrogen (30 mL/min) with a heating rate of 10 K/min. Solution-state nuclear magnetic resonance (NMR) spectra were recorded on a Varian Mercury Vx400 spectrometer. $^{27}$Al solid-state magic-angle spinning (MAS) NMR experiments were carried out on a Bruker DSX 300 spectrometer at a frequency of 78.2 MHz. The sample was spun at 5 kHz with a single pulse of π/6 and a recycle delay of 0.5 s. Scanning electron microscope (SEM) images were taken from a LEO 1530 instrument. Molecular weights of polyamines were estimated by gel permeation chromatography with a system comprised of a Shimadzu LC-20AD pump, a Shimadzu RID-10A RI detector, a Shimadzu SPD-20A UV detector, a Shimadzu CTO-20A column oven, and Tosoh Bioscience TSKgel PWXL Guard, Viscotek Viscogel G6000 and G4000 columns mounted in series.

Example 1

Synthesis of Aziridine

To a 250-mL round-bottom flask containing 2-chloroethylamine hydrochloride (Aldrich, 30 g) was add a sodium hydroxide aqueous solution (25.8 g of sodium hydroxide (VWR) in 170 g of deionized water). The resultant solution was heated to 50° C. and stirred at this temperature for 2 h. Aziridine was then recovered by a partial static vacuum distillation at 75° C. The collected distillate was dried over sodium hydroxide pellets. The upper layer of liquid was decanted and the purified aziridine was obtained as a colorless oil in 70-80% yield. $^1$H NMR (400.0 MHz, $(CD_3)_2SO$, TMS): δ (ppm) 1.17, 1.53; $^{13}$C NMR (100.6 MHz, $(CD_3)_2SO$, TMS): δ (ppm) 17.4.

Example 2

Preparation of SBA-15 Mesoporous Silica

Figure 6:
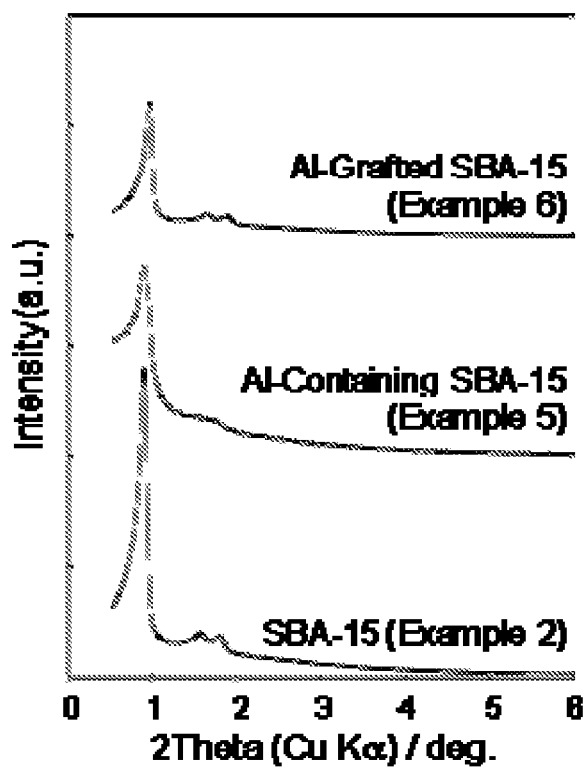
FIG. 6 illustrates XRD patterns of SBA-15 mesoporous silica (Example 2; bottom), Al-containing SBA-15 mesoporous aluminosilica (Example 5; middle), and Al-grafted SBA-15 mesoporous aluminosilica (Example 6; top).
Figure 7:
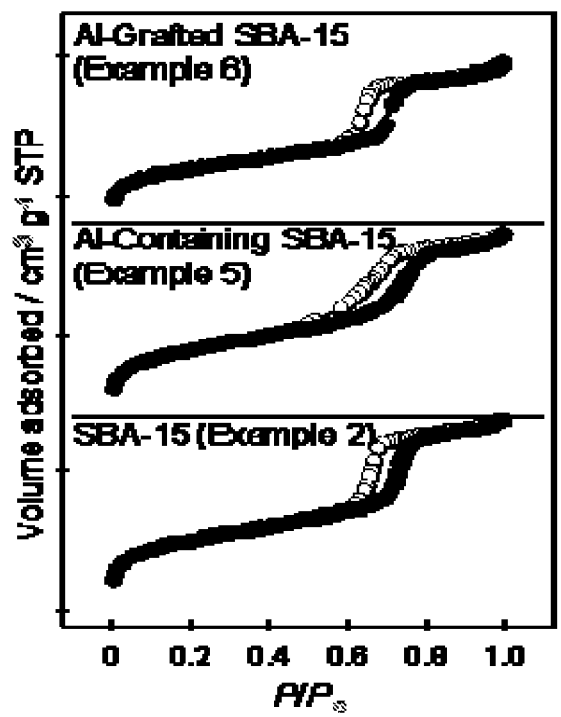
FIG. 7 illustrates nitrogen adsorption-desorption isotherms of SBA-15 mesoporous silica (Example 2; bottom), Al-containing SBA-15 mesoporous aluminosilica (Example 5; middle), and Al-grafted SBA-15 mesoporous aluminosilica (Example 6; top). Filled and empty symbols represent adsorption and desorption branches, respectively.

Pluronic P123 $EO_{20}$—$PO_{70}$-$EO_{20}$ triblock copolymer (Aldrich, 15.30 g), concentrated hydrochloric acid (BDH, 72 g) and deionized water (328 g) were mixed in a 1-L Erlenmeyer flask. After being stirred for 5 h at 40° C., 25.4 g of tetraethyl orthosilicate (TEOS, Aldrich) was added to the stirred solution. The resultant mixture was stirred for 21 h at 40° C., producing a cloudy solution with a white precipitate. Subsequently, this mixture was heated statically at 100° C. for 24 h. SBA-15 material was isolated by filtration and washed with a copious amount of deionized water. The obtained white solid was dried at 75° C. overnight. The organic template was removed by calcination at 550° C. for 6 h with an intermediate step at 150° C. for 2 h (a heating rate of 1° C./min). The resulting SBA-15 mesoporous silica was characterized by XRD and nitrogen physisorption. As shown in FIG. 6, the calcined SBA-15 material exhibits XRD peaks with (100), (110), and (200) reflections, which is the characteristic of a 2D hexagonal mesostructure. The nitrogen adsorption-desorption isotherm of the calcined SBA-15 shown in FIG. 7 is the IUPAC Type IV isotherm with hysteresis, indicating the presence of mesopores. The apparent Brunauer-Emmett-Teller (BET) specific surface area, total pore volume, and non-local density functional theory (NL-DFT) pore diameter of the calcined SBA-15 were calculated to be 920 m$^2$/g, 1.07 cm$^3$/g, and 8.0 nm, respectively.

Example 3

Preparation of Polyamines on SBA-15 Mesoporous Silica Via Vapor-Phase Transport For the laboratory scale experiment, polymerization of aziridine on the calcined SBA-15 via vapor-phase transport was carried out in a 15-mL glass pressure tube. Typically, the calcined SBA-15 was hand-ground by a mortar and pestle and then dried at 105° C. for at least 48 h. About 0.15 g of the well ground and dried SBA-15 was added into the pressure tube. A small glass test tube (12×75 mm, VWR) containing a different amount of aziridine was then placed inside the pressure tube. The pressure tube was closed tightly and heated to a desired temperature for a specified period of reaction time. The reaction was quenched by adding the pressure tube into an ice bath. The solid sample was washed with excess amounts of methanol and acetone and recovered by filtration. The resulting solid was dried under high vacuum at room temperature overnight.

Figure 8:
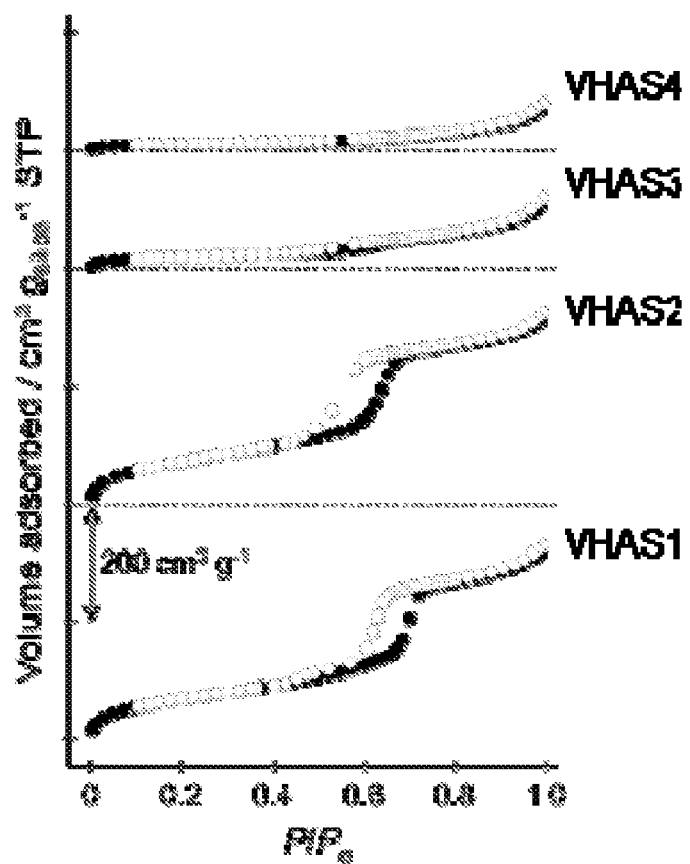
FIG. 8 illustrates nitrogen adsorption-desorption isotherms of SBA-15-supported polyamines synthesized at 70° C. for 24 h (Example 3). Filled and empty symbols represent adsorption and desorption branches, respectively.
Figure 9:
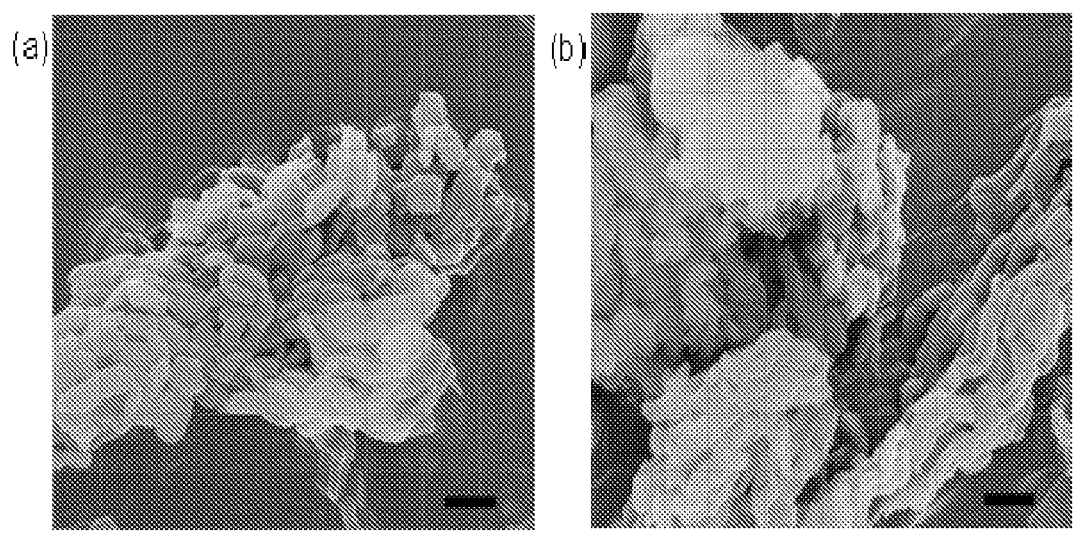
FIG. 9 illustrates SEM images of (a) VHAS1 and (b) VHAS4 (Example 3), where the scale bars are 1 nm.

Aziridine was polymerized on SBA-15 with the different aziridine-to-SBA-15 ratios. In contrast to the liquid-phase synthesis, during polymerization the aziridine monomers are transported into the solid supports in the vapor phase and subsequently polymerization is initiated at the support surface. As shown in Table 1, the amount of aziridine affected the final organic content of the obtained materials. As the amount of aziridine was increased, the organic content was increased while the BET surface area and total pore volume were reduced. Comparing with the calcined SBA-15, the reduction of BET surface area and total pore volume indicated that at least some portions, if not all, of the polyamines are occluded in the pore space of the SBA-15 support. The nitrogen adsorption-desorption isotherms of the SBA-15-supported polyamines shown in FIG. 8 also suggested that the pore diameters of the obtained materials was decreased as the amount of aziridine was increased because the hysteresis loops shifted to the lower relative pressures. SEM images of VHAS1 and VHAS4 depicted in FIG. 9 further supported that the exteriors of the materials are not covered with polyamines

TABLE 1

The SBA-15-supported polyamines synthesized at 70° C. for 24 h with a different amount of aziridine*

| Sample | Amount of aziridine (g) | Organic content (wt %) | Amine loading (mmol N/g) | BET surface area (m$^2$/g) | Total pore volume (cm$^3$/g) |
|---|---|---|---|---|---|
| VHAS1 | 0.15 | 30.61 | 7.12 | 180 | 0.34 |
| VHAS2 | 0.30 | 34.84 | 8.10 | 170 | 0.31 |
| VHAS3 | 0.45 | 42.49 | 9.88 | 40 | 0.09 |
| VHAS4 | 0.60 | 45.47 | 10.58 | 20 | 0.06 |

*The organic content and amine loading were identified by TGA measurement, while the BET surface area and total pore volume were calculated from nitrogen physisorption measurement.

Effects of reaction temperature and time on the organic content were also investigated. As shown in Table 2, both parameters influenced the organic contents of the obtained materials. The higher temperature and the longer reaction time resulted in the higher organic loadings. Interestingly, the materials with significant content of organic moieties can also be prepared at room temperature.

TABLE 2

The SBA-15-supported polyamines synthesized with 0.15 g of SBA-15:0.6 g of aziridine at different reaction temperature and time*

| Sample | Reaction temperature (° C.) | Reaction time (h) | Organic content (wt %) | Amine loading (mmol N/g) |
|---|---|---|---|---|
| VHAS5 | 25 | 168 | 31.05 | 7.22 |
| VHAS6 | 50 | 24 | 35.13 | 8.17 |
| VHAS7 | 50 | 48 | 43.31 | 10.07 |
| VHAS8 | 60 | 24 | 39.34 | 9.15 |
| VHAS9 | 80 | 24 | 44.62 | 10.38 |

*The organic content and amine loading were identified by TGA measurement.

Example 4

Preparation of Mesoporous Alumina

Mesoporous γ-alumina was synthesized by surfactant-mediated self-assembly of pseudobomite nanoparticles.

First, 13.75 g of commercial pseudoboehmite received from Sasol North America (Catapal B, 74.3% $Al_2O_3$) was dispersed in a mixture of nitric acid (Fisher Scientific, ~70%, 1.27 g) and deionized water (200 mL). The suspension was sonicated at room temperature for 90 min and then stirred at 60° C. for 17 h. After cooling down to room temperature, the obtained alumina sol was added slowly to a stirred ethanol (Sigma, 200 proof, 200 mL) solution of Pluronic P123 $EO_{20}$—$PO_{70}$-$EO_{20}$ triblock copolymer (Aldrich, 15.30 g). The resulting solution was stirred at room temperature for 24 h. Subsequently, the solvent was evaporated in an open beaker at 60° C. for 60 h. The obtained P123-alumina composite was further dried at 75° C. for 24 h. This composite was calcined at 700° C. for 4 h with an intermediate step at 150° C. for 1 h (a heating rate of 1 K/min), resulting in the white peptized-sol-gel derived mesoporous γ-alumina Its apparent BET specific surface area, total pore volume, and NL-DFT pore diameter were calculated to be 240 $m^2/g$, 1.2 $cm^3/g$, and 19.9 nm, respectively.

Example 5

Preparation of Al-Containing SBA-15 Mesoporous Aluminosilica

Figure 10:
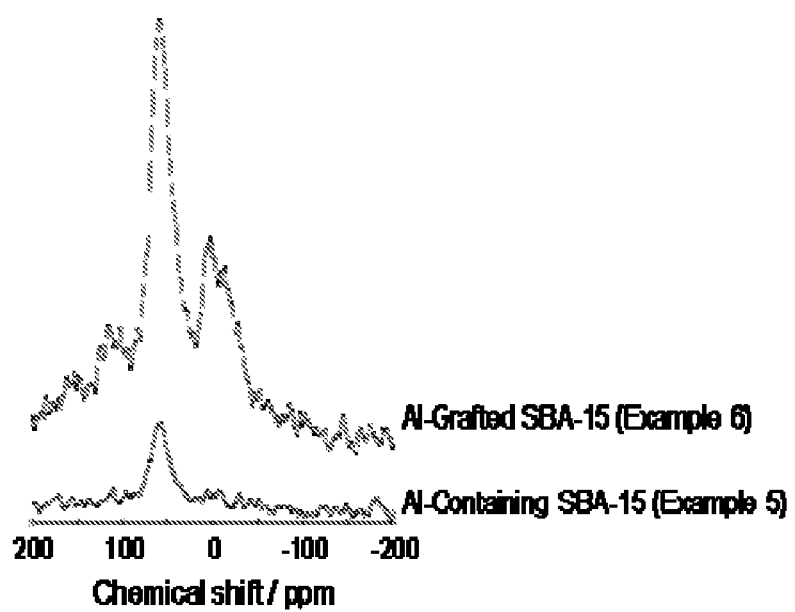
FIG. 10 illustrates $^{27}Al$ MAS NMR spectra of Al-containing SBA-15 mesoporous aluminosilica (Example 5; bottom) and Al-grafted SBA-15 mesoporous aluminosilica (Example 6; top).

SBA-15 mesoporous aluminosilica was directly synthesized similar to the procedures described in Example 2 with the initial pH of 2. Typically, 8 g of P123 triblock copolymer (Aldrich) and 0.1 g of ammonium fluoride ($NH_4F$, Sigma) were dissolved in 300 mL of 0.0316 M hydrochloric acid. The resulting mixture was vigorous stirred at room temperature for 5 h. Separately, 16.9 g of TEOS (Aldrich) was pre-hydrolyzed in 20 mL of 0.0316 M hydrochloric acid for 30 min. Then, 0.83 g of aluminum isopropoxide (Aldrich) was added to the pre-hydrolyzed TEOS solution. The obtained aluminosilicate solution was vigorous stirred at room temperature for 3 h. To the P123-$NH_4F$ solution was added dropwise the aluminosilicate solution while stirring. The mixture was stirred for 21 h at 40° C. and subsequently heated at 100° C. for 24 h without stirring. The white powder was isolated by filtration, washed with a copious amount of deionized water, and dried at 75° C. overnight. The organic P123 template was removed by calcination at 550° C. for 6 h with an intermediate step at 150° C. for 2 h (a heating rate of 1 K/min). As shown in FIG. 6, the calcined SBA-15 material exhibits a distorted 2D hexagonal mesostructure. The nitrogen adsorption-desorption isotherm of the calcined SBA-15 shown in FIG. 7 is the IUPAC Type IV isotherm with hysteresis, indicating the presence of mesopores. Its apparent BET specific surface area and total pore volume were calculated to be 890 $m^2/g$ and 1.0 $cm^3/g$, respectively. The presence of aluminum species was confirmed by solid-state MAS NMR as shown in FIG. 10.

Example 6

Post-Modification of SBA-15 Mesoporous Silica by Grafting

The acidity of SBA-15 material was modified by post-synthetic grafting of aluminum species onto the SBA-15 surface. The pristine SBA-15 material was synthesized according to the procedures in Example 2. The aluminate solution was prepared by dissolving 0.26 g of aluminum isopropoxide (Aldrich) in 60 mL of 0.03 M hydrochloric acid. After being stirred at room temperature for 6 h, the aluminate solution was added 1.5 g of the calcined SBA-15. The suspension was stirred at room temperature for 18 h. The suspension was filtered and washed with deionized water. The recovered SBA-15 was dried at 75° C. overnight and then calcined at 550° C. for 6 h with an intermediate step at 150° C. for 2 h (a heating rate of 1 K/min) As shown in FIG. 6, the Al-grafted SBA-15 material exhibits XRD peaks with (100), (110), and (200) reflections, which is the characteristic of a 2D hexagonal mesostructure. Its nitrogen adsorption-desorption isotherm shown in FIG. 7 is the IUPAC Type IV isotherm with hysteresis, indicating the presence of mesopores. Its apparent BET specific surface area and total pore volume were calculated to be 710 $m^2/g$ and 0.87 $cm^3/g$, respectively. The presence of aluminum species was confirmed by solid-state MAS NMR as shown in FIG. 10.

Example 7

Preparation of Carboxylate (COOH) Functionalized SBA-15 Mesoporous Aluminosilica SBA-15 mesoporous silica was organically functionalized with carboxylate groups (—COOH). In a typical synthesis, 6 g of P123 triblock copolymer (Aldrich) was weighed into a 500-mL Erlenmeyer flask. Then, 36 g of concentrated hydrochloric acid (J. T. Baker) and 167 g of deionized water were added and stirred at 40° C. for 2 h. 12 g of TEOS (Aldrich) was then added and the mixture was stirred at 40° C. for another 45 min pre-hydrolysis time. Then, 2.4 g of carboxyethylsilanetriol sodium salt (Gelest) was added. The resulting mixture was stirred at 40° C. for 20 h and then aged statically at 100° C. for 24 h. The resulting solid was filtered, washed with excess deionized water and then dried overnight on the aspirator. The P123 template was removed by Soxhlet extraction with tetrahydrofuran (THF). Finally, the solid material was refluxed in 50% sulfuric acid to completely remove P123. The organic moieties were determined to be 11.52 wt %. The apparent BET specific surface area, total pore volume, and NL-DFT pore diameter of the extracted material were calculated to be 620 $m^2/g$, 1.07 $cm^3/g$, and 9.4 nm, respectively.

Example 8

Preparation of Polyamines on Various Supports Via Vapor-Phase Transport

The same procedure described in Example 3 was used to prepare polyamines on disordered amorphous silica (CS-6080, PQ Corporation) and various supports prepared in Examples 4-7. As shown in Table 3, increase in acidity of SBA-15 material by incorporation of aluminum, either via direct synthesis (Example 5) or by post-synthetic modification (Example 6), enhanced the polymerization of aziridine. The results in Table 3 also suggest that the polymerization of aziridine by vapor phase transport is universal on various supports. In general, any supports containing hydroxyl (—OH) and thiol (—SH) groups on the surface can be used to prepare polyamine via ring-opening polymerization.

TABLE 3

The polyamines prepared on various supports*

| Sample | Support | Reaction temperature (° C.) | Organic content (wt %) | Amine loading (mmol N/g) |
|---|---|---|---|---|
| VHAS10 | CS-6080 silica | 70 | 20.2 | 4.7 |
| VHAS11 | Mesoporous alumina (Example 4) | 50 | 5.8 | 1.3 |
| VHAS12 | Mesoporous alumina (Example 4) | 70 | 9.8 | 2.3 |
| VHAS13 | Al-containing SBA-15 (Example 5) | 50 | 36.5 | 8.5 |
| VHAS14 | Al-containing SBA-15 (Example 5) | 60 | 45.6 | 10.6 |
| VHAS15 | Al-grafted SBA-15 (Example 6) | 50 | 36.7 | 8.5 |
| VHAS16 | Al-grafted SBA-15 (Example 6) | 60 | 41.8 | 9.7 |
| VHAS17 | Carboxylate SBA-15 (Example 7) | 50 | 31.7** | 7.4 |

*The support to aziridine mass ratio and reaction time were fixed at 0.15 g:0.6 g and 24 h, respectively. The organic content and amine loading were identified by TGA measurement.
**The total organic content was 39.56 wt % with a polyamine content of 31.69 wt %.

Example 9

Estimation of Molecular Weights of the Polyamines

Molecular weights of the supported polyamines were estimated by GPC technique. The supported polyamines were cleaved from the solid support by alkali treatment. About 0.5 g of supported polyamines was dispersed in 100 mL of deionized water. Then, 35 g of potassium hydroxide (Fluka) was added to the dispersion. The resulting mixture was stirred at 50° C. for 24 h, after which after which the support was degraded into soluble species. At least 70 g of water was removed by rotary evaporation at about 60° C. The remaining solution was kept in a freezer overnight. The polyamines were phase-separated and recovered for GPC analysis. Commercial poly(ethylenimine)s with molecular weights of 800, 1300, 2000, and 25,000 Daltons (all from Aldrich) were used to generate a calibration curve. The estimated molecular weights are summarized in Table 4.

TABLE 4

The polyamines prepared on various supports*

| Sample | Molecular weight (Dalton) |
|---|---|
| VHAS4 | 950 |
| VHAS6 | 530 |
| VHAS8 | 620 |
| VHAS9 | 1060 |

Example 10

Synthesis of Azetidine

Azetidine was prepared by distillation of azetidine hydrochloride over potassium hydroxide. To a 100-mL round-bottom flask was added potassium hydroxide (Fluka, 7.1 g) and deionized water (4 mL). The mixture was stirred until potassium hydroxide was completely dissolved. Then, 5 g of azetidine hydrochloride (Aldrich) was added to the stirred potassium hydroxide solution. Azetidine was isolated by distillation and stored in a freezer. $^1$H NMR (400.0 MHz, CDCl$_3$, TMS): δ (ppm) 1.99, 2.25, 3.55; $^{13}$C NMR (100.6 MHz, CDCl$_3$, TMS): δ (ppm) 22.1, 48.2.

Example 11

Preparation of Supported-Polyamines from Azetidine Via Vapor-Phase Transport

The same procedure described in Example 3 was used to prepare polyamines from azetidine synthesized in Example 10 on SBA-15 mesoporous silica prepared in Example 2. The material prepared at 80° C. for 24 h had the organic loading of 16.7 wt % (equivalent to 2.93 mmol N/g) with the BET surface area and total pore volume of 340 m$^2$/g and 0.66 cm$^3$/g, respectively. This result suggested that the present method is not limited to aziridine but is also applicable for larger nitrogen-containing heterocycles such as azetidine.

Example 12

Adsorption of CO$_2$ by Supported Polyamine Materials

CO$_2$ adsorption measurements were performed on VHAS 7 as an example under anhydrous conditions using a TA Q500 thermogravimetric analyzer. Certified mixtures of CO$_2$ and argon with CO$_2$ concentrations of 10% and 400 ppm (Matheson Tri-Gas) were used to simulate flue gas and ambient air, respectively. To remove moisture and CO$_2$ pre-adsorbed on the adsorbents, the samples were loaded in a platinum pan and subjected to pretreatment under a flow of argon (Airgas South, UHP grade) at 110° C. for 3 h with a heating rate of 5 K/min. Then, the temperature was decreased to 25° C. with a rate of 5 K/min and held for 1 h to stabilize the sample weight and temperature before introducing the CO$_2$-containing gas. Adsorption experiments were started by exposing the samples to a flow of dry CO$_2$—Ar gas mixture. Adsorption capacities were 0.64 and 0.69 mmol CO$_2$/g measured using 400 ppm CO$_2$ for 12 h and 10% CO$_2$ for 6 h, respectively.

Summary

Preparation of supported polyamines via vapor-phase transport has been presented. In contrast to the conventional solution-phase method, in which the supports are dispersed in the organic solution, typically toluene, of aziridine, in the vapor-phase method the liquid aziridine and the solid support are placed separately in the same environment. The aziridine is transported into the support surface via vapor-phase. Ring-opening polymerization then occurs on the support surface, resulting in polyamine covalently tethered to the supports, although other types of bonds could be formed. The data shown here suggest that this method can be carried out in a wide range of preparation parameters. The advantage of the present method over the previous solution-based method is that this vapor-phase method can be applied to the structural forms of supports such as membranes and monoliths in the large scale operation in a straightforward manner. In an embodiment, a carrier gas can transport the monomer vapor. It is anticipated that vapor phase synthesis could allow structured adsorbents to be regenerated in the field via vapor phase treatments.

It should be noted that ratios, concentrations, amounts, dimensions, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a range of "about 0.1% to about 5%" should be interpreted to include not only the explicitly recited range of about 0.1% to about 5%, but also include individual ranges (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the numerical value and measurement technique. In addition, the phrase "about 'x' to 'y'" includes "about 'x' to about 'y'".

It should be emphasized that the above-described embodiments of this disclosure are merely possible examples of implementations, and are set forth for a clear understanding of the principles of this disclosure. Many variations and modifications may be made to the above-described embodiments of this disclosure without departing substantially from the spirit and principles of this disclosure. All such modifications and variations are intended to be included herein within the scope of this disclosure and protected by the following claims.

Therefore, the following is claimed:

1. A method of making a structure comprising a polyamine supported on a solid substrate, the method comprising: contacting a monomer having a nitrogen-containing heterocycle with a solid substrate material, wherein the monomer is in the vapor phase; and forming a hyperbranched polyamine polymer on a surface of the solid substrate material.

2. The method of claim 1, wherein the hyperbranched polyamine polymer is formed at a temperature of about 0° to 200° C. for a time period of about 2 h to 200 h.

3. The method of claim 1, wherein the monomer is selected from the group consisting of: an aziridine monomer, an azetidine monomer, a pyrrolidine monomer, and a diazetidine monomer, and a combination thereof.

4. The method of claim 1, wherein the solid substrate material is selected from the group consisting of: silica, alumina, aluminosilicates, zirconia, germania, magnesia, titania, hafnia, iron oxide, mixed oxides composed of those elements, and organically modified derivatives of each of these.

5. The method of claim 4, wherein the organically modified silicate includes carboxylate groups on the surface of the solid substrate material.

6. The method of claim 5, wherein the hyperbranched polymer is covalently bonded to an oxygen of the hydroxyl group on the surface of the solid substrate material.

7. The method of claim 1, wherein the hyperbranched polymer is an ethyleneamine hyperbranched polymer.

8. The method of claim 1, wherein the hyperbranched polymer includes units having the formula RwN—CR2-CR2, wherein R is selected from H and a functional group, wherein w is 0, 1, or 2.

9. The method of claim 1, wherein the hyperbranched polymer includes units having the formula HwN—CH2-CH2, wherein w is 0, 1, or 2.

10. The method of claim 4, wherein the hyperbranched polymer is covalently bonded via a silicon compound to one or more oxygen atoms on the surface of the solid substrate material, wherein the silicon compound has the formula Si(OCH3), wherein Si forms bonds to one, two, or three oxygen atoms on the surface of the pore.

11. The method of claim 5, wherein the solid substrate material is porous and wherein the pores extend below the outer surface of the solid substrate, and wherein a molecule having the formula —(CRIR2)s-XHP is covalently bonded to the oxygen of a hydroxyl group on the inside surface of a pore, wherein s is 1 to 10, wherein each of RI and R2 are independently selected from the group consisting of: H, an alkyl, a substituted alkyl, an aryl, a substituted aryl, an alkenyl, a substituted alkenyl, an alkynyl, a substituted alkynyl, and a combination thereof, where a substitution is from a group selected from the group consisting of: F, CI, Br, I, N, P, S, and 0, wherein X is selected from the group consisting of: N—R, S, and P—R, where N or P bonds to the HP, wherein R is selected from the group consisting of: H, an alkyl, a substituted alkyl, an aryl, a substituted aryl, an alkenyl, a substituted alkenyl, an alkynyl, a substituted alkynyl, and a combination thereof, where the substitution is from a group selected from the group consisting of: F, CI, Br, I, I, N, P, S, and 0, wherein if X is N—R or P—R, then R is selected from the group consisting of: HP, H, an alkyl, a substituted alkyl, an aryl, a substituted aryl, an alkenyl, a substituted alkenyl, an alkynyl, a substituted alkynyl, and a combination thereof, where the substitution is from a group selected from the group consisting of: F, CI, Br, I, N, P, S, and 0, and wherein HP is the hyperbranched polymer.

12. The method of claim 1, wherein the solid substrate material is porous and wherein the pores extend below the outer surface of the solid substrate, and wherein a molecule having the formula —SiR4q(CRIR2)s-X—HP is covalently bonded to one, two, or three oxygen atoms on the surface of a pore, wherein s is 1 to 10, wherein each of RI and R2 are selected from the group consisting of: H, an alkyl, a substituted alkyl, an aryl, a substituted aryl, an alkenyl, a substituted alkenyl, an alkynyl, a substituted alkynyl, and a combination thereof, where a substitution is from a group selected from the group consisting of: F, CI, Br, I, N, P, S, and 0, wherein X is selected from the group consisting of: N—R, S, and P—R, where P bonds to the HP, wherein R is selected from the group consisting of: H, an alkyl, a substituted alkyl, an aryl, a substituted aryl, an alkenyl, a substituted alkenyl, an alkynyl, a substituted alkynyl, and a combination thereof, where the substitution is from a group selected from the group consisting of: F, CI, Br, I, N, P, S, and 0, wherein R4 is selected from the group consisting of: an alkyl, a substituted alkyl, an alkenyl, a substituted alkenyl, a methyl, a substituted methyl, an alkoxyl, a substituted alkoxyl, a methoxy, a n-propoxy, an isopropoxy, a halogen, and N(R)2, wherein q is 1 or 2, and wherein HP is the hyperbranched polymer.

13. The method of claim 1, further comprising: removing unreacted monomer from the solid substrate material.

14. The method of claim 13, wherein the step of removing unreacted monomer from the solid substrate material comprises flowing a gas across the surface of the solid substrate material to remove unreacted monomer.

15. The method of claim 1, wherein the structure of the solid substrate material is selected from the group consisting of: a porous structure, a fiber, a capillary tube, a disk membrane, a tubular membrane, a sheet, and a monolith.

16. The method of claim 1, wherein the solid substrate material is an organic polymer.

17. The method of claim 1, wherein the solid substrate material has a longest dimension of about 500 nm to 500 μm.

18. The method of claim 1, wherein the solid substrate material has a dimension, perpendicular to the gas flow direction, of about 2 mm to 100 cm.

19. The method of claim 1, wherein the solid substrate material is porous and includes one or more oxygen atoms on the surfaces of the pores.

* * * * *